UNITED STATES PATENT OFFICE.

GEORGE McLEAN, OF BROOKLYN, NEW YORK, ASSIGNOR TO HIMSELF, JOEL P. STILLWELL, AND GEO. DELAND, OF NEW YORK CITY.

IMPROVEMENT IN BURNING-FLUID.

Specification forming part of Letters Patent No. 70,346, dated October 29, 1867.

*To all whom it may concern:*

Be it known that I, GEORGE MCLEAN, of Brooklyn, in the county of Kings and State of New York, have invented certain new and useful Improvements in Illuminating-Compounds; and I do hereby declare that the following is a full, clear, and exact description thereof, reference being had to the accompanying drawings, making part of this specification, and to the letters of reference marked thereon—like letters indicating like parts wherever they occur.

To enable others skilled in the art to construct and use my invention, I will proceed to describe it.

My invention relates to illuminating-compounds, and consists of the composition of certain ingredients in such proportions as to produce a burning-fluid of a superior quality, and one that is at the same time both safe and economical.

In manufacturing my illuminating-compound I take a barrel containing forty (40) gallons of gasoline, and draw from it into a five (5) or six (6) gallon tin can two and a half ($2\frac{1}{2}$) or three (3) gallons of the gasoline. Then I put into this can the following ingredients, viz: One pound and a half ($1\frac{1}{2}$ lb.) of whiting, five ounces (5 oz.) of gum benzoin, five ounces (5 oz.) of sweet spirits of niter, three ounces (3 oz.) of spirits of ammonia aromatic, three-fourths pound ($\frac{3}{4}$ lb.) of common salt, one ounce (1 oz.) of the oil of sassafras, and one ounce (1 oz.) of almond oil, and mix them all thoroughly by shaking, stirring, or any other convenient way, for five or six minutes. This done, I allow the mixture to settle for a few minutes and then pour it into the barrel of gasolene, from which the five or six gallons were first taken, and mix the whole thoroughly. The compound thus made is now ready for use.

By means of a mixture of this kind I am able to produce a cheap, non-explosive, and superior illuminating-compound free from smoke and all disagreable odors, and one that will last longer and at the same time give a a better light than the best quality of kerosene.

Having thus described my invention, what I claim is—

The illuminating-compound, composed of the ingredients substantially as herein described, and for the purposes set forth.

GEORGE McLEAN.

Witnesses:
H. B. MUNN,
W. C. DODGE.